United States Patent
Gross

(10) Patent No.: US 10,899,459 B2
(45) Date of Patent: Jan. 26, 2021

(54) LINEAR GUIDE MECHANISM FOR A PASSENGER SEAT

(71) Applicant: Airbus Operations GmbH, Hamburg (DE)

(72) Inventor: Claus-Peter Gross, Buxtehude (DE)

(73) Assignee: Airbus Operations GmbH

( * ) Notice: Subject to any disclaimer, the term of this patent is extended or adjusted under 35 U.S.C. 154(b) by 293 days.

(21) Appl. No.: 15/874,958

(22) Filed: Jan. 19, 2018

(65) Prior Publication Data
US 2018/0215471 A1    Aug. 2, 2018

(30) Foreign Application Priority Data

Jan. 27, 2017 (DE) .......................... 10 2017 101 642

(51) Int. Cl.
*B64D 11/06* (2006.01)
*B60N 2/015* (2006.01)

(52) U.S. Cl.
CPC ........ *B64D 11/0696* (2013.01); *B64D 11/064* (2014.12)

(58) Field of Classification Search
CPC ...... B60N 2/0155; B60N 2/07; B60N 2/0702; B64D 11/0696; B64D 11/064
USPC ........ 248/646, 647, 649, 676, 677, 424, 429
See application file for complete search history.

(56) References Cited

U.S. PATENT DOCUMENTS

| | | | | |
|---|---|---|---|---|
| 4,771,969 A * | 9/1988 | Dowd | ................ | B64D 11/0696 244/118.6 |
| 4,796,837 A * | 1/1989 | Dowd | ................ | B64D 11/0696 244/122 R |
| 4,913,489 A * | 4/1990 | Martin | ................ | B60P 7/0815 248/429 |
| 5,178,346 A * | 1/1993 | Beroth | ................ | B64D 9/003 244/118.1 |
| 5,520,357 A * | 5/1996 | Payne | ................ | B61D 45/006 244/118.1 |
| 5,871,318 A * | 2/1999 | Dixon | ................ | B60N 2/01558 244/118.1 |
| 7,232,096 B1 * | 6/2007 | Ahad | ................ | B64D 11/0696 244/118.6 |
| 7,975,979 B2 * | 7/2011 | Bishop | ................ | B60P 7/0815 244/118.6 |

(Continued)

FOREIGN PATENT DOCUMENTS

| | | |
|---|---|---|
| DE | 202004018114 U1 | 2/2005 |
| DE | 102007004554 A1 | 7/2008 |

(Continued)

OTHER PUBLICATIONS

Search Report for German Application No. 10 2017 101 642.2 dated Nov. 18, 2017. (p. 2 categorizing the cited references).

*Primary Examiner* — Terrell L McKinnon
*Assistant Examiner* — Michael McDuffie
(74) *Attorney, Agent, or Firm* — Lerner, David, Littenberg, Krumholz & Mentlik, LLP

(57) ABSTRACT

A linear guide mechanism for a passenger seat includes a movable carriage and a guide rail. The linear guide mechanism further includes a guide unit for positioning the movable carriage on the guide rail. The guide unit includes at least one guide element and a fastening element. Moreover, the guide unit is substantially fixed to the movable carriage by the fastening element. The guide unit and the movable carriage are displaceably mounted on the guide rail.

11 Claims, 4 Drawing Sheets

(56) References Cited

U.S. PATENT DOCUMENTS

| | | | | |
|---|---|---|---|---|
| 8,376,306 B2* | 2/2013 | Dowty | ............... | B61D 33/0057 248/429 |
| 8,517,310 B2* | 8/2013 | Marechal | ........... | B60N 2/01516 244/118.6 |
| 8,628,053 B2* | 1/2014 | Marechal | ........... | B64D 11/0696 244/118.5 |
| 8,820,697 B2* | 9/2014 | Marechal | ........... | B64D 11/0696 244/118.6 |
| 8,827,228 B2* | 9/2014 | Zunino | ............... | B60N 2/01575 244/118.1 |
| 8,899,545 B2* | 12/2014 | Blees | ........................ | B64D 9/00 244/118.1 |
| 8,944,378 B2* | 2/2015 | Bishop | ............... | B64D 11/0696 244/118.1 |
| 2008/0197234 A1 | 8/2008 | Wilhelm et al. | | |
| 2010/0001546 A1* | 1/2010 | Christensen | ....... | B64D 11/0696 296/65.13 |
| 2010/0260541 A1 | 10/2010 | Daouk | | |
| 2011/0121155 A1* | 5/2011 | Salani | ................. | B64D 11/0696 248/429 |
| 2011/0225773 A1 | 9/2011 | Hearn et al. | | |
| 2011/0309195 A1 | 12/2011 | Bishop et al. | | |
| 2013/0038103 A1* | 2/2013 | Scott | ....................... | B64D 11/06 297/248 |
| 2014/0306060 A1* | 10/2014 | Schomacker | ............ | B60N 2/07 244/118.6 |
| 2014/0353454 A1* | 12/2014 | Yamada | ............... | B60N 2/0705 248/430 |
| 2015/0041608 A1* | 2/2015 | Sawdy | ................. | B60N 2/0722 248/429 |
| 2015/0306981 A1* | 10/2015 | Arakawa | ............... | B60N 2/0705 248/429 |
| 2016/0039314 A1* | 2/2016 | Anticuar | ............... | B60N 2/0806 248/429 |
| 2016/0121760 A1* | 5/2016 | Kuhley | ................ | B60N 2/0806 248/429 |
| 2017/0259924 A1* | 9/2017 | Olulana | ............... | B64D 11/064 |
| 2019/0134762 A1* | 5/2019 | Mialhe | .................. | B23P 11/005 |

FOREIGN PATENT DOCUMENTS

| | | |
|---|---|---|
| DE | 102011017752 A1 | 10/2012 |
| DE | 102015116414 A1 | 3/2017 |
| DE | 102015122675 A1 | 6/2017 |
| GB | 2426549 A | 11/2006 |
| WO | 2016181623 A1 | 11/2016 |
| WO | 2017055364 A1 | 4/2017 |

* cited by examiner

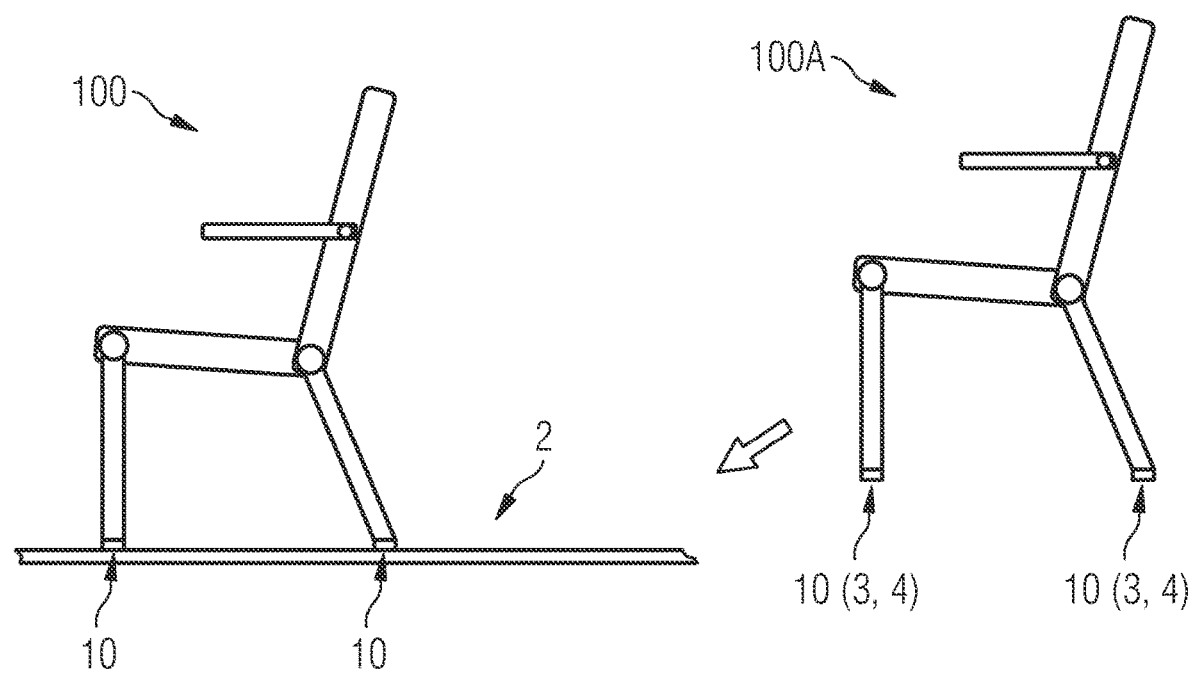

LINEAR GUIDE MECHANISM FOR A PASSENGER SEAT

FIELD OF THE INVENTION

The present invention relates to a linear guide mechanism for a passenger seat.

BACKGROUND OF THE INVENTION

The number and distribution of seats in a passenger cabin of an aircraft may represent an important economic factor. In order to adapt seating arrangements to the required use of cabin space, it is possible by means of the prior art to displace the seat benches and individual passenger seats rapidly via linear guide systems in order to generate, for example, more legroom for other seat rows. The operating principle of such a system is disclosed in DE 202004018114 U1. A similar principle is also disclosed in WO 2016/181623 A1.

BRIEF SUMMARY OF THE INVENTION

An aspect of the invention proposes a solution which permits passenger seating systems or passenger seats in aircraft cabins to be attached rapidly and easily onto the guide rails provided therefor.

A linear guide mechanism for a passenger seat is specified, said linear guide mechanism comprising a movable carriage and a guide rail. Moreover, the linear guide mechanism comprises a guide unit for positioning the movable carriage on the guide rail. The movable carriage is preferably guided by rolling bearings, via rolling bearings on the guide rail. The correct positioning of the movable carriage on the guide rail is required in order to prevent tilting and the resulting damage associated therewith on the internally located bearing components, for example on ball bearings. The guide unit comprises at least one guide element which is designed to simplify the attachment of the movable carriage onto the guide rail, hereinafter called "positioning on the rail". In order to be able to fasten the guide unit on the movable carriage, said guide unit also comprises a fastening element. Advantageously, in its design the fastening element is kept flat and provided with fastening points. The fastening points in the fastening element permit a fixing of the guide unit to the movable carriage, for example via a screw connection. The guide unit, therefore, is displaceably mounted together with the movable carriage on the guide rail.

A preferred exemplary embodiment of the guide unit has at least one guide element which comprises a recess which is configured to be at least partially complementary to the guide rail. The basic profile of the guide rail, in this case, is significant for the design of the shape of the recess. The recess in the guide element is designed as a positive connection, i.e. as complementary to the design of the profile of the guide rail. If, for example, a guide rail which is T-shaped in cross section forms the basis, the recess in the guide element forms a T-shaped negative cross section which fits into the profile of the guide rail. The recess in the guide element permits a sliding guidance of the guide unit. Moreover, the recess extends over the entire length of the guide element.

The first guide element according to an embodiment of the invention is positioned on the front face of the movable carriage. This advantageous positioning at the end of the carriage, which is positioned first on the rail, prevents damage by tilting of the carriage, relative to rapid and careless mounting of passenger seats and/or entire seat benches which potentially have a plurality of carriages on the seat frames.

The first guide element comprises a substantially vertical bore. This bore fully penetrates the guide element in the vertical direction.

A second guide element is positioned on the movable carriage with a recess which is at least partially complementary to the profile of the guide rail. Since the movable carriage is displaceable in the longitudinal direction of the guide rail, it is advantageous if a second guide element in the opposing direction leads to improved positioning and absorption of forces in the event of the movable carriage tilting, and thus at the same time prevents damage to the ball bearings. This also permits passenger seats to be positioned on the rail irrespective of the direction. The recess is designed in a similar manner to the recess in the first guide element.

The guide unit comprises a substantially horizontal bore. This bore fully penetrates the guide unit in the horizontal direction. The bore forms the connection point, for example by means of a screw connection of a rear seat frame of a passenger seat and/or passenger seat system to the linear guide mechanism.

The first and/or second guide element according to an embodiment of the invention has a friction-reducing coating on the contact surfaces with the guide rail. This coating permits a simpler positioning on the rail and reduces increased wear when installing and dismantling passenger seats and/or passenger seating systems. An improvement of the sliding guidance is thereby achieved.

The vertical bore of the first guide element is designed for receiving a releasable fastening bolt. The fastening bolt is advantageously designed to have a positive connection with the vertical bore in order to reduce the occurrence of the action of shear forces.

The vertical bore and the releasable fastening bolt may form a locking portion and a securing of the position of the passenger seat. The longitudinal axis of a vertical bore in the guide rail, of the vertical bore in the first guide element and of the fastening bolt have to form a congruent position in this case relative to one another in order to secure and/or to release the position. The locking and unlocking is ensured simply by pulling out and/or inserting the fastening bolt. The fastening bolt may be integrated in a seat locking device.

The linear guide mechanism is designed and configured for a dynamic load which may act on the passenger seat. Loads which could occur during the flight have to be considered, in the embodiment of a linear guide mechanism according to the invention, since permission of an aircraft seat for air transport is granted only according to the specified regulations.

Also encompassed by the invention is a passenger seat having at least one seat frame and at least one seat fitting, wherein the guide unit and the movable carriage are designed for fixing to the seat fitting of the passenger seat and/or the passenger seating system.

Moreover, an aircraft having a guide rail is encompassed by the invention, wherein the guide rail is provided to receive the movable carriage and the guide unit of a linear guide mechanism according to the invention. A passenger seat fastened thereto or a passenger seating system may, therefore, be positioned in a displaceable manner within a specific area in an aircraft.

BRIEF DESCRIPTION OF THE DRAWINGS

Preferred exemplary embodiments and advantages of the invention are disclosed in the following description of the figures.

FIG. 4 shows a two-dimensional schematic view with a passenger seat positioned on the guide rail and a passenger seat not yet positioned.

DETAILED DESCRIPTION

Figure 1:
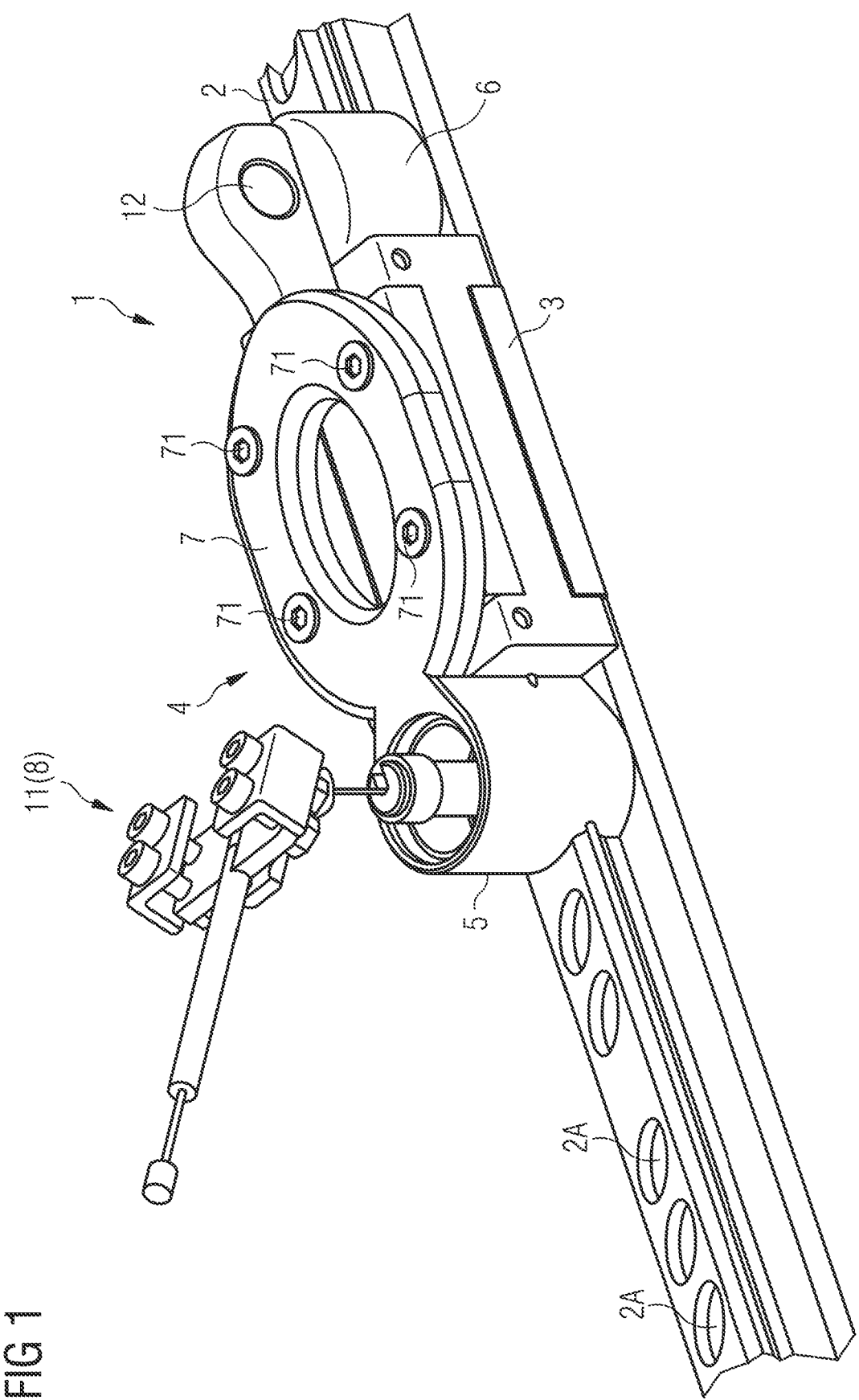
FIG. 1 shows a view of the linear guide mechanism.

In the various figures, the same or identical elements are provided with the same reference numerals.

FIG. 1 shows a view of the linear guide mechanism 1. A guide rail 2 comprises vertical bores 2A. The vertical bores 2A in the guide rail 2 are spaced apart from one another and ensure a positioning of a passenger seat which is able to be altered in the longitudinal direction of the guide rail 2. The guide rail 2 may be connected to the aircraft structure. A movable carriage 3 is guided on the guide rail 2. In order to ensure a guidance which is as free of friction as possible, the movable carriage 3 is preferably guided by rolling bearings, for example via ball bearings. The movable carriage 3 permits a displacement in the longitudinal direction of the guide rail 2 and thus a repositioning of passenger seats (see FIG. 4). A guide unit 4 consisting of a first guide element 5, a second guide element 6 and a fastening element 7 is positioned on the upper face of the movable carriage 3. The guide unit 4 forms a type of protective attachment for the movable carriage 3. The fastening element 7 connects the guide unit 4 to the movable carriage 3 advantageously via fastening points 71. The first guide element 5 has a vertical bore 11 which is designed to receive a releasable fastening bolt 8. The second guide element 6 has on its upper face a horizontal bore 12 which is provided for fixing a passenger seat frame by means of a screw connection. This advantageous arrangement of the horizontal bore 12 permits a low-level construction of the linear guide mechanism 1.

Figure 2:
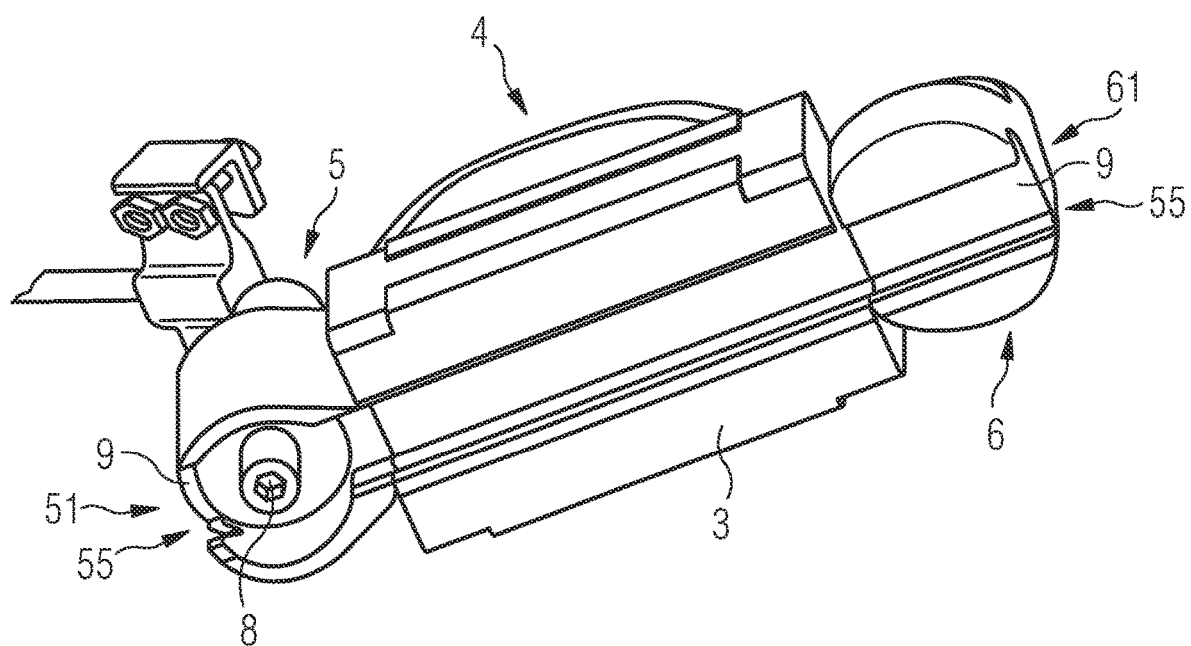
FIG. 2 shows a view of the movable carriage with the guide unit according to an embodiment of the invention.

FIG. 2 shows a partial view of the linear guide mechanism 1 in a view from below with the guide unit 4 and the movable carriage 3. The first guide element 5 has a recess 9 which advantageously in its design is complementary to the profile of the guide rail 2. The recess 9 of the movable carriage 3 and of the second guide element 6 are configured in a similar manner thereto. This shape of the recesses 9 permits an at least partially positive connection of the guide rail with the movable carriage 3 and the guide unit 4 and an accurate movement of the linear guide mechanism 1 on the guide rail 2 in the manner of a sliding guide. The figure shows the recess 9 in the first guide element 5, which permits a sliding guidance of the guide unit 4 on the guide rail. The profiled edge of the recess 9 on the front face 51 of the first guide element 5 is preferably chamfered or provided with a radius. The profiled edge, which is thus shaped, forms an element for positioning on the rail 55. The element for positioning on the rail 55 simplifies the positioning of passenger seats on the rail during installation. The second guide element 6 also comprises the element for positioning on the rail 55 which is positioned on the front face 61 of the second guide element 6 and permits a positioning on the rail in the opposing direction.

Figure 3:
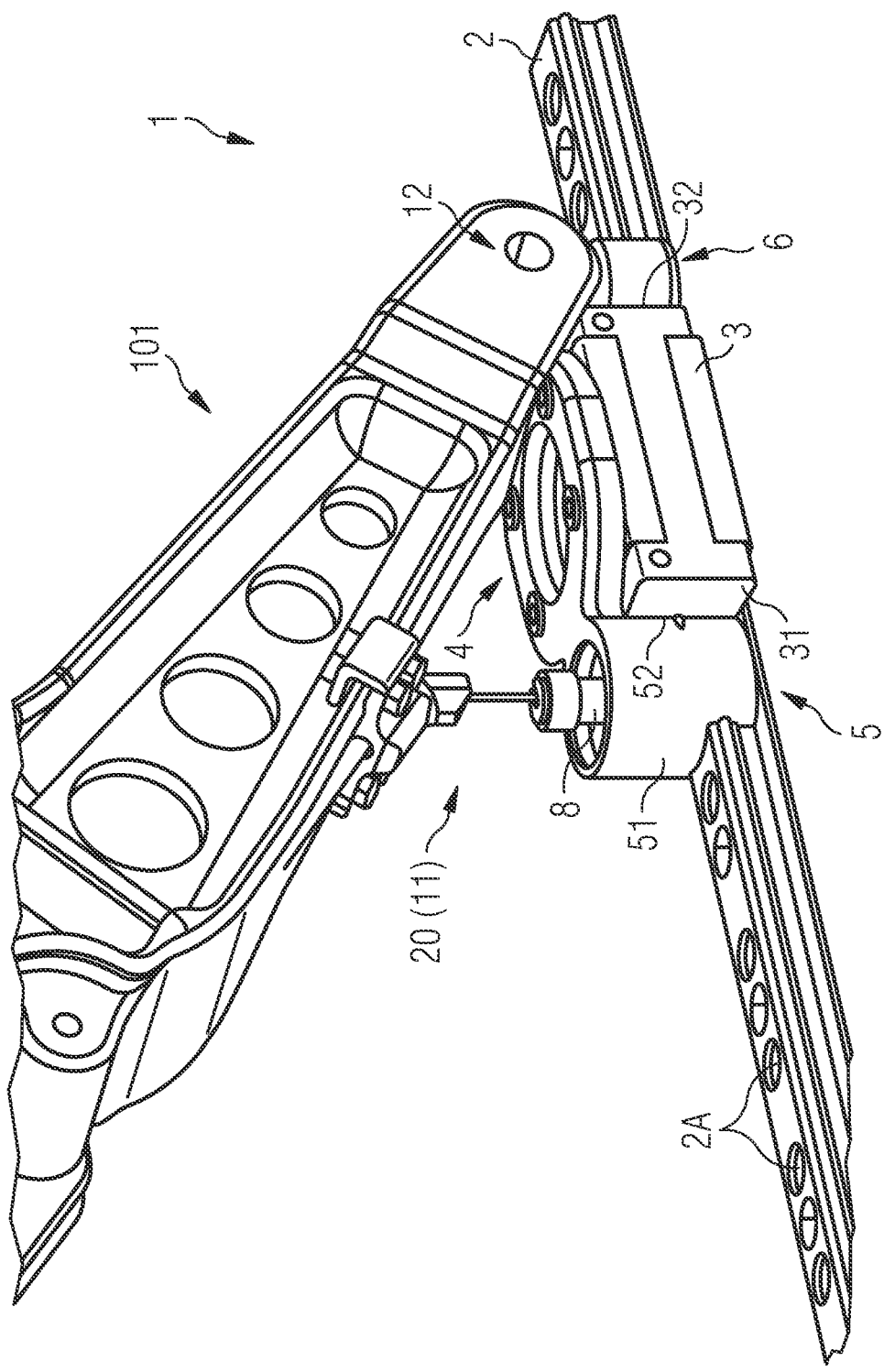
FIG. 3 shows a view of the linear guide mechanism with a rear seat frame of a passenger seat.

FIG. 3 shows the linear guide mechanism 1 with the seat frame 101 of a passenger seat. The linear guide mechanism 1 comprises in this case the guide rail 2, the movable carriage 3 and the guide unit 4. The figure partially shows the seat frame 101 of a passenger seat. The first guide element 5 is positioned such that the rear face of the guide element 52 and the front face 31 of the movable carriage 3 may oppose one another and/or may also be in contact with one another. The second guide element 6 is positioned similarly on the rear face 32 of the movable carriage 3. The seat frame 101 of a passenger seat in this case is fixed via the horizontal bore 12 of the second guide element 6 to the guide unit 4. The selected position of a passenger seat on the guide rail 2 is fixed by a locking portion. This locking of the position of the passenger seat is produced via the seat locking unit 20. The seat locking unit 20 consists of the fastening bolt 8, the vertical bore 11 in the first guide element 5 and any vertical bore 2A in the guide rail 2.

FIG. 4 shows a two-dimensional schematic view with the passenger seat 100 positioned on the guide rail 2 and a passenger seat 100A not yet positioned. The figure shows the positioning of the passenger seat 100A on the rail with the seat fittings 10, the guide unit 4 and the movable carriage 3 present. The passenger seat 100 is fixed in its position after being positioned on the rail and locked to the guide rail 2.

LIST OF REFERENCE NUMERALS

1 Linear guide mechanism
2 Guide rail
2A Vertical bore in guide rail
3 Movable carriage
4 Guide unit
5 First guide element
6 Second guide element
7 Fastening element
8 Releasable fastening bolt
9 Recess
10 Seat fitting
11 Vertical bore
12 Horizontal bore
20 Seat locking unit
31 Front face of movable carriage
32 Rear face of movable carriage
51 Front face of first guide element
52 Rear face of first guide element
55 Element for positioning on rail
61 Front face of second guide element
71 Fastening points
100 Passenger seat
100A Unpositioned passenger seat
101 Seat frame While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A linear guide mechanism for a passenger seat, comprising:
   a movable carriage having a front face, a rear face, and an upper face;
   a guide rail; and
   a guide unit for positioning the movable carriage on the guide rail,
   wherein the guide unit comprises at least one guide element and at least one fastening element extending from the at least one guide element, the at least one guide element having a rear face facing the front face of the movable carriage,
   wherein the guide unit is substantially fixed to the movable carriage by the at least one fastening element positioned on the upper face of the movable carriage,
   wherein the guide unit is displaceably mounted together with the movable carriage on the guide rail, and
   wherein the at least one guide element comprises a recess configured to be at least partially complementary to the profile of the guide rail.

2. The linear guide mechanism according to claim 1, wherein the first guide element is positioned on the front face of the movable carriage.

3. A linear guide mechanism for a passenger seat, comprising:
   a movable carriage having a front face, a rear face, and an upper face;
   a guide rail; and
   a guide unit for positioning the movable carriage on the guide rail,
   wherein the guide unit comprises at least one guide element and at least one fastening element extending from the at least one guide element, the at least one guide element having a rear face facing the front face of the movable carriage,
   wherein the guide unit is substantially fixed to the movable carriage by the at least one fastening element positioned on the upper face of the movable carriage,
   wherein the guide unit is displaceably mounted together with the movable carriage on the guide rail, and
   wherein the first guide element comprises a substantially vertical bore.

4. A linear guide mechanism for a passenger seat, comprising:
   a movable carriage having a front face, a rear face, and an upper face;
   a guide rail; and
   a guide unit for positioning the movable carriage on the guide rail,
   wherein the guide unit comprises at least one guide element and at least one fastening element extending from the at least one guide element, the at least one guide element having a rear face facing the front face of the movable carriage,
   wherein the guide unit is substantially fixed to the movable carriage by the at least one fastening element positioned on the upper face of the movable carriage,
   wherein the guide unit is displaceably mounted together with the movable carriage on the guide rail, and
   wherein a second guide element is positioned on the movable carriage with a recess which is at least partially complementary to the profile of the guide rail.

5. The linear guide mechanism according to claim 1, wherein the guide unit comprises a substantially horizontal bore.

6. The linear guide mechanism according to claim 1, wherein the contact surfaces of the recess have a friction-reducing coating relative to the guide rail of at least one of the first and second guide element.

7. The linear guide mechanism according to claim 3, wherein the vertical bore of the first guide element is configured to receive a releasable fastening bolt.

8. The linear guide mechanism according to claim 7, wherein the vertical bore and the releasable fastening bolt form a locking portion and permit a securing of the position of the passenger seat in the bores of the guide rail.

9. The linear guide mechanism according to claim 1, wherein the linear guide mechanism is configured for a dynamic load which acts on a passenger seat.

10. The passenger seat having at least one seat frame and at least one seat fitting, wherein the guide unit and the movable carriage are configured for fixing to the seat fitting of the passenger seat according to claim 1.

11. An aircraft having the guide rail provided to receive the movable carriage and the guide unit according to claim 10.

* * * * *